United States Patent [19]

Seiler

[11] 3,724,880
[45] Apr. 3, 1973

[54] THRUST SAFETY IN SOCKET CONNECTIONS OF PIPES

[76] Inventor: Georg Seiler, Pachmayrplatz 11, Munich, Germany

[22] Filed: May 20, 1971

[21] Appl. No.: 145,328

[30] Foreign Application Priority Data

July 10, 1970 Germany......................P 20 34 325.3

[52] U.S. Cl. ....................285/105, 285/111, 285/321
[51] Int. Cl................................................F16l 17/02
[58] Field of Search......285/105, 104, 321, 230, 231, 285/382.7, 306, 343, 113, 339, 421

[56] References Cited

UNITED STATES PATENTS

| | | | |
|---|---|---|---|
| 3,384,392 | 5/1968 | Gilchrist | 285/105 |
| 2,508,914 | 5/1950 | Graham | 285/105 |
| 2,226,304 | 12/1940 | Dillon | 285/105 X |
| 3,167,331 | 1/1965 | Marshall | 285/321 X |
| 2,991,092 | 7/1961 | MacKay | 285/231 X |
| 2,899,217 | 8/1959 | Ashbrook et al. | 285/105 |
| 2,283,975 | 5/1942 | Dillon | 285/104 |
| 2,017,994 | 10/1935 | Spang | 285/105 |
| 3,248,135 | 4/1966 | Meripol | 285/343 X |

FOREIGN PATENTS OR APPLICATIONS 237,391   12/1964   Austria...............................285/105

Primary Examiner—Thomas F. Callaghan
Attorney—Whittemore, Hulbert and Belknap

[57] ABSTRACT

The invention relates to a thrust safety in socket connections of pipes, in particular pressure pipes, for the supply networks of cities or the like, made of malleable iron or plastic, with a sealing ring to seal the gap between the socket and the pipe end, the inside surface of the socket tapering down slightly under a predetermined inclination towards the socket end and serving to receive a clamping ring.

15 Claims, 10 Drawing Figures

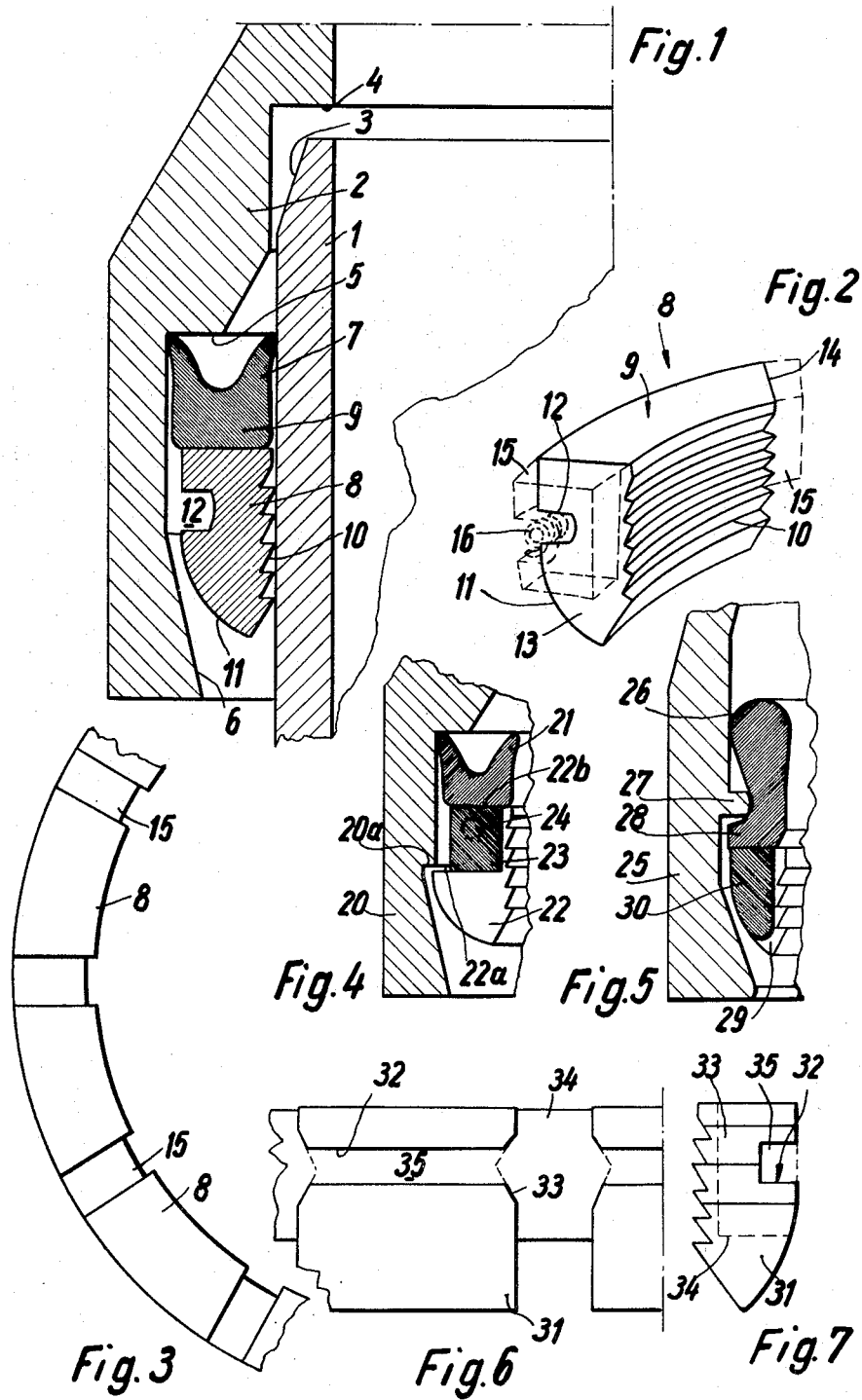

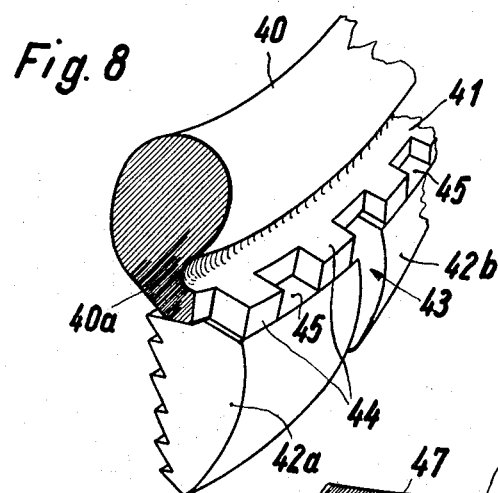
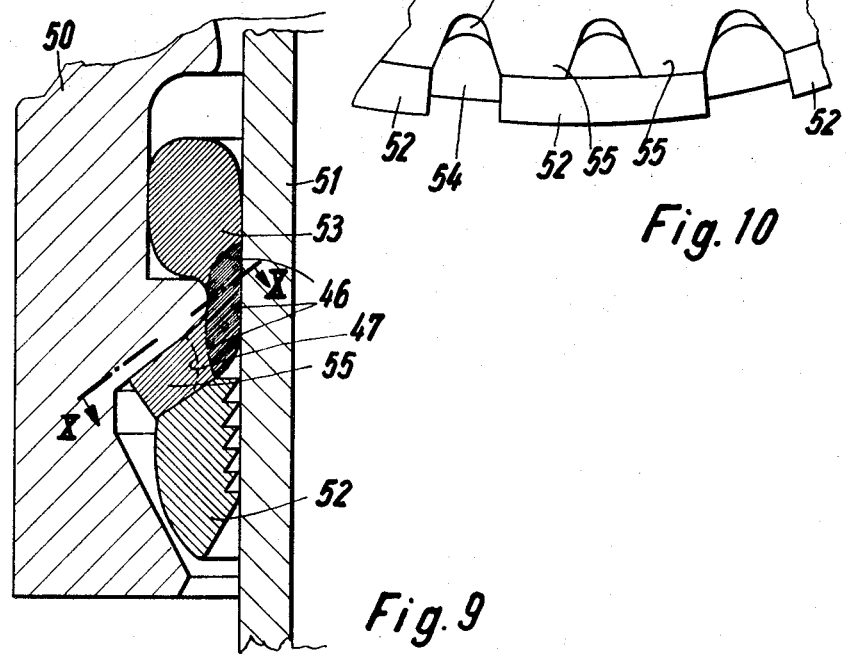

THRUST SAFETY IN SOCKET CONNECTIONS OF PIPES

BACKGROUND OF THE INVENTION

In practical application, both screw socket and plug-in socket connections have proven out well. Among the plug-in socket connections for pressure pipes of malleable cast iron it was particularly the socket connection known under the trade name TYTON which stood the test in practice. It consists of a soft rubber section oriented toward the interior of the pipe and a hard rubber section which is integrally joined to the former and which, by means of an annular groove, grips over an annular rib in the interior of the socket, thus being secured in axial direction. Further known are plug-in socket connections for plastic pipes in which the expanded socket has an annular recess into which is inserted a seal approximately kidney-shaped in cross section and possessing sealing ribs projecting inward.

In such socket connections there can occur extraneously acting pulling forces or thrust forces caused by the internal pressure of the flow medium, which forces tend to loosen the connection between the pipe sections. The sealing rings are either unable or able to a small extent only to absorb these forces. Therefore, relatively complicated safety measures have become known to transmit the tensional and thrust forces from pipe to pipe, relieving the socket connection. These safeties are complicated and require additional work at the construction site. For small diameter pipes, particularly plastic pipes, safety measures are known in which a special, sleeve-shaped connector is pushed from both sides into the pipe ends. This connector has conical ends in which is inserted a slotted clamping wire, a few clamping balls being distributed over its circumference in circumferential direction. This, too, requires a special connector.

SUMMARY OF THE INVENTION

It is the objective of the present invention to develop a thrust safety of the type described at the outset so that the absorption of tensional and thrust forces is assured while sealing at the same time, and with simplicity of design and assembly of the safety.

According to the invention, this objective is achieved in that the clamping ring consists of a multiplicity of clamping pieces retained by intermediary sections of an elastic material elastically in predetermined mutual peripheral spacings and in predetermined mutual position.

Due to this design, the clamping pieces can yield elastically in radial direction as well as perform, within certain limits, elastic tipping motions relative to each other in order to be able to adapt to irregularities of the pipe circumference. In spite of this relatively great mobility of the clamping pieces with respect to each other, their mutual position is secured by the intermediary sections of elastic material. It is through these intermediary sections that the mutual peripheral spacing of the clamping pieces is maintained, which is of importance for the attainment of a uniform clamping action over the entire circumference and for keeping the pipes concentric. The relative mobility of the clamping pieces permits a compensation of the outside diameter tolerances as well as inside diameter tolerances of the telescoping pipes. Due to the possibility of relative tilting about an axis extending in circumferential direction, the clamping effect is also greatly supported when tensional or thrust forces occur.

The clamping pieces and the intermediary sections may be permanently interconnected by cementing, vulcanizing or the like. The clamping pieces are readily and cheaply produced by injection molding, for instance. Also, joining the clamping pieces to the intermediary elastic sections is readily accomplished with automatic machinery. Each clamping piece expediently has a greater axial length than radial width, and its outer peripheral surface is crowned to make tilting relative to the conical bearing surface in the interior of the socket possible even in clamped position. The clamping pieces expediently present on their inner peripheral surface teeth extending in circumferential direction. The inward oriented face surface is plane and may be perpendicular or slightly inclined conically to the axis of the pipes to serve as bearing surface for the sealing ring. Advantageously, clamping pieces and sealing ring may also be permanently interconnected by cementing, vulcanizing or the like.

The internal pressure in the pipes, stemming from the flow medium contained in them, tends to push the sealing ring outward. Since it rests against the clamping ring, the sealing ring pushes the clamping ring in front of itself until the clamping ring's crowned peripheral surface rests against the conical guide surface of the socket. The pressure sees to it that, in connection with this oblique guide surface, the clamping ring reduces its diameter and that the teeth dig into the peripheral surface of the introduced pipe end, thus assuring the desired safety.

The clamping pieces may present a hole or groove extending in circumferential direction into which is inserted an elastic or flexible ring element which keeps the clamping pieces under such a preload in radial direction inward against the elastic deforming force of the intermediary sections that the teeth of the clamping pieces make sufficiently intimate contact with the periphery of the pipe end when the pipe end is introduced. But the elastic material of the intermediary sections may also extend, at least partly, into said grooves or peripheral holes in order to thus achieve a better anchorage with the clamping pieces.

The intermediary sections of elastic material between adjacent clamping pieces further take care that the sealing ring cannot press itself into the spaces between adjacent clamping pieces when the operating pressure acts upon the sealing ring.

The sealing ring may consist of a less elastic, annular sector resting against the face of the clamping pieces and of at least one more elastic, annular sector integrally joined to the former, the less elastic sector being divided into block-like part sectors by a multiplicity of recesses spaced in circumferential direction. This assures that the block-like part sectors can sufficiently expand laterally when the bearing surface is compressed, without the danger of squeezing a part of the material off. Also, this provides for greater ductility of the bearing surface to favor the relative mobility of the clamping pieces.

In the following, the invention will be explained in greater detail by way of several implementation examples and schematic drawings.

FIG. 1 is an axial section of the connection between two pipes with a thrust safety according to the invention.

FIG. 2 is a perspective inside view of a clamping piece of the clamping ring according to FIG. 1.

FIG. 3 is a top view of a part of the clamping ring of the thrust safety according to FIG. 1.

FIGS. 4 and 5 are perpendicular sections of thrust safeties designed in accordance with the invention, in modified form.

FIG. 6 is an outside view and

FIG. 7 a side view of a clamping piece of another modified design of a clamping ring.

FIG. 8 shows another modified implementation example in perspective view from the outside on a part of the clamping ring.

FIG. 9 is a perpendicular section similar to that in FIG. 1 of another implementation example of the invention.

FIG. 10 is a section along line X—X of the arrangement according to FIG. 9.

The thrust safety according to FIG. 1 involves a plug-in socket connection in which the smooth, inserted end 1 of the one pipe and the socket at the end of the other pipe are shown in section in operational position. To facilitate insertion, the plane pipe end presents a bevel 3 while the face of the pipe comes to rest against a shoulder 4 of the socket to limit the inserted length.

Another shoulder 5, against which a sealing ring 7 can come to rest, is provided in the socket 2. In the example illustrated, the sealing ring is an elastic ring in the form of a lip seal having a Q-shaped profile.

The inside of the free end of the socket is conically constricted toward the outside, as indicated at 6. Between the sealing ring 7 and the constricted end 6 of the socket there is formed an annular space for a clamping ring 8 consisting of various clamping pieces spaced in circumferential direction. The clamping pieces are held together by intermediary sections 15 of elastic material. Together with the intermediary sections, the clamping pieces present a plane face surface 9 oriented in axial direction toward the interior of the socket. This face 9 serves the direct contact of the sealing ring 7. On their inside, the clamping pieces present teeth 10 engaging the peripheral area of the introduced pipe 1. The outer peripheral surface of the clamping pieces is crowned, as indicated at 11. This crowned surface cooperates with the conical guide surface 6 of the socket.

The clamping pieces may present a groove 12 extending in circumferential direction, located in the example shown at the outside diameter. It could also be disposed at the plane face surface 9. A helical spring 16 or another elastic element may be inserted into said groove, according to FIG. 2. The helical spring 16 is expediently preloaded in order to preload the intermediary sections 15 of elastic material in compression accordingly.

The elastic material of the intermediary sections 15, which may consist of rubber, rests against the faces 13 and 14 of the clamping pieces and is expediently joined permanently by cementing, vulcanizing or the like.

As FIG. 3 shows, the intermediary sections are slightly recessed with respect to the teeth. In addition, they keep the clamping pieces 8 mutually spaced at undefined distances. This is essential for a reliable thrust safety brought about by the clamping ring. The intermediary sections 15 allow a relative motion of the clamping pieces both in circumferential direction and in the form of a tilting motion about an axis extending in circumferential direction. Therefore, the clamping pieces can reliably adapt to irregularities of the circumferential surface of the pipe.

Since the clamping pieces are of greater axial length than radial width, they cannot tilt into a useless position.

Expediently, the clamping ring may be slightly preloaded radially inward so as to become expanded even at the smallest permissible pipe diameter. This preloading may be accomplished by the intermediary sections 15 and/or the elastic insert 16.

To prevent the clamping ring from being inserted too far when the pipe end is introduced into the socket, there may be provided, according to FIG. 4, in the inside surface of the socket 20 a shoulder 20a against which rests a countershoulder 22a at the clamping pieces 22, thereby limiting the inward motion of the clamping ring. Furthermore, the clamping pieces of this implementation example present a peripheral hole 24 into which the elastic material of the intermediary sections 23 extends at least partly. The sealing ring 21 corresponds to the sealing ring 7 of FIG. 1, resting against the bearing surface formed by the faces of the clamping pieces 22 and of the intermediary sections 23.

In the implementation example shown in FIG. 5 there is shown a seal for screw socket connections known under the trade name TYTON seal. It consists of a foot section 28 integrally connected to a soft rubber section 26 via an annular groove. By means of the annular groove the sealing ring grips over an annular rib 27 in the interior of the socket, thereby being secured in axial direction. The foot section, being of a harder material, rests in this design on the face of the clamping ring which is formed of the clamping pieces 29 and the intermediary sections 30 and which cooperates with the socket 25 in the manner described above.

In all implementation examples, the pressure building up in the interior of the pipe lines tends to push the sealing ring outward. Since it rests against the clamping ring, it pushes the latter in front of itself until the crowned surface 11 of the clamping pieces makes contact with the conical guide surface 6 of the socket. From this moment forward, the internal pressure of the flow medium, acting in axial direction, is transformed by the guide surface into a radial, inward oriented clamping pressure which pushes the clamping pieces in radial direction against the outer circumference of the inserted pipe end. During this process the teeth of the clamping pieces dig into the ductile cast material or plastic material and assure a reliable lock. The same process takes place when external tension forces act upon the pipes. Since the teeth have frictional contact with the pipe end, the clamping ring is taken along during this separating motion of the pipes until the crowned surface 11 again rests against the conical guide surface 6, developing with increasing tension an increasing clamping pressure oriented radially inward which again takes care of a firm anchorage of the clamping pieces in the surface of the pipe end.

The implementation examples according to FIGS. 6 and 7 show how the elastic material of the intermediary sections 33 anchors itself in recesses 33 at the faces of the clamping pieces 31, extending through a peripheral groove 32 in the form of elastic webs 35.

It is assumed in the implementation examples according to FIGS. 8 to 10 that the sealing ring is firmly connected to the correlated clamping ring by cementing, vulcanizing or the like, although this is not an absolute prerequisite for this implementation example.

According to FIGS. 8 to 10, the respective, sealing, soft rubber section 40 or 53 is integrally connected to a foot section 41 or 55 which likewise consists of soft rubber and which rests on the face 45 of the clamping pieces 42a, 42b or 52 by a neck section 40a or 46 of a harder material whose outside diameter is constricted in the clamped condition of the sealing ring (compare FIG. 9). As FIG. 9 shows, the harder section 46 is located in the clamped condition of the sealing ring as a piston-like ring in the area of the narrowest part of the sealing chamber between the pipe end 51 and the socket 50. It is thus able to transmit reliably to the foot section 55 and clamping pieces 52, respectively, the axial forces absorbed from the internal pressure of the pipes by the soft rubber section 53 in FIG. 9. On the other hand, the soft rubber section in the foot area assures a limitation of the resistance when inserting the pipe end 51 into the socket. The neck sections 40a and 46 of harder material may also be formed by reinforcing inserts of metal or the like vulcanized into the soft rubber.

To further increase the compressibility of the foot section, the latter presents cutouts dividing it into blocks 44. The cutouts assure sufficient space for the lateral flow of material upon the compression of the foot section. Recognizable at 45 is the face surface of the clamping pieces, at 43 the mutual spacing between adjacent clamping pieces, determined by the elastic sectors.

As is evident from FIGS. 9 and 10, the bearing surface, together with the foot section, may be in a plane conical to a plane perpendicular to the axis of the pipes. Also, the block-shaped sections of the foot section may be limited by sidewalls converging towards the outside. The contour of the foot section at the end of a cutout is represented at 47 while the elastic intermediary section between two adjacent clamping pieces 52 is recognizable at 54.

What is claimed is:

1. A pipe sleeve joint between two pipes one of which has at least one smooth end and the other of which has at least one sleeved end, said sleeved end having a conical radially inner surface adjacent the free end thereof with the smaller diameter of the cone being at the free end of the sleeve, the radially outer surface of the smooth end of the one pipe and the radially inner surface of the sleeved end of the other pipe defining an annular space, comprising a sealing ring located in said space and surrounding the smooth end of the one pipe and in sealing engagement with the radially outer surface of the smooth end of the one pipe and the radially inner surface of the sleeved end of the other pipe, and a clamping ring located in said space and surrounding the smooth end of the one pipe and axially supporting said sealing ring in said space, said clamping ring comprising a continuous elastically deformable ring comprised of a plurality of circumferentially spaced apart clamping pieces having crowned radially outer peripheral surfaces and having gripping means on the radially inner surfaces thereof to radially grip the radially outer surface of the smooth end of the one pipe, said clamping pieces being circumferentially spaced apart by means of intermediary pieces of elastic material, said clamping pieces have circumferentially disposed side faces and the intermediary pieces are primarily disposed in the area of said side faces and are secured to said clamping pieces, at least some of the clamping pieces and the intermediary pieces have substantially flat radially extending axial faces in direct contact with said sealing ring, said clamping ring being held in said space and forced radially inwardly by means of the conical inner surface of said sleeved end engaging the crowned radially outer surface of said clamping pices when axial thrust arises between said smooth end and said sleeved end.

2. A joint as defined in claim 1 wherein said faces lie in a common plane which is inclined with respect to the plane perpendicular to the longitudinal axis of the pipes.

3. A joint as defined in claim 1 wherein the radially inner surface of the sleeved end defines a shoulder portion axially spaced apart from the free end of said sleeve.

4. A joint as defined in claim 3 wherein the radially inner surface of the sleeved end defines a second shoulder portion axially spaced apart from the free end of said sleeve and said shoulder portion.

5. The joint as defined in claim 1, wherein the clamping pieces and the elastic intermediary pieces are permanently interconnected.

6. The joint as defined in claim 1, wherein the clamping pieces have a groove extending in a circumferential direction in their radially outer surfaces and the material of the intermediary pieces projects at least part into said grooves.

7. The joint as defined in claim 6, wherein an elastic tension member is inserted in the circumferential groove.

8. The joint as defined in claim 7, wherein the radially inward oriented preloading force of the tension member is so selected that the clamping ring, prior to being assembled, is held to an inside diameter smaller than the outside diameter of the pipe by elastically deforming the material of the intermediary sectors.

9. The joint as defined in claim 1 wherein each clamping piece presents an axial extent noticeably greater than its radial thickness, as well as a crowned outer circumferential surface, a toothed inner peripheral surface and a wide, end plane bearing face, approximately axially oriented for the seating of the sealing ring.

10. The joint as defined in claim 9, wherein the bearing surfaces of all clamping pieces lie in a common plane in the shape of a truncated cone which is slightly inclined with respect to a plane perpendicular to the longitudinal axis.

11. The joint as defined in claim 9 wherein the sealing ring and the clamping ring are permanently interconnected.

12. The joint as defined in claim 11, wherein the sealing ring includes an annular, soft rubber foot section resting against the face surface of the clamping pieces, which foot section is integrally connected to a soft rubber sealing section by a neck section which is constricted in its radially outer diameter and composed of harder rubber.

13. The joint as defined in claim 12, wherein the foot section is divided into block-like part sections by a multiplicity of edge recesses disposed so as to be spaced in circumferential direction.

14. The joint as defined in claim 13, wherein the recesses between the block sections of the foot section of the sealing ring present a peripheral width decreasing from the outside towards the axis.

15. The joint as defined in claim 14, wherein the peripheral width of the recesses separating the block-like part sections decreases in the direction toward the annular axis.

* * * * *